(12) United States Patent
Higuma

(10) Patent No.: US 9,674,420 B2
(45) Date of Patent: Jun. 6, 2017

(54) LENS APPARATUS AND IMAGE CAPTURING APPARATUS

(71) Applicant: CANON KABUSHIKI KAISHA, Tokyo (JP)

(72) Inventor: Kazuya Higuma, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 55 days.

(21) Appl. No.: 14/737,905

(22) Filed: Jun. 12, 2015

(65) Prior Publication Data

US 2015/0365583 A1 Dec. 17, 2015

(30) Foreign Application Priority Data

Jun. 16, 2014 (JP) ................................ 2014-123084

(51) Int. Cl.
*H04N 5/232* (2006.01)
*H04N 5/357* (2011.01)

(52) U.S. Cl.
CPC ..... *H04N 5/23209* (2013.01); *H04N 5/23212* (2013.01); *H04N 5/3572* (2013.01)

(58) Field of Classification Search
CPC . H04N 5/232; H04N 5/23212; H04N 5/23209
See application file for complete search history.

(56) References Cited

U.S. PATENT DOCUMENTS

| 2002/0171750 | A1* | 11/2002 | Kato | H04N 5/2254 348/345 |
| 2005/0140815 | A1* | 6/2005 | Nakano | G02B 7/102 348/345 |
| 2007/0104474 | A1* | 5/2007 | Tamura | G03B 17/14 396/91 |
| 2009/0060486 | A1* | 3/2009 | Higuma | G03B 17/14 396/71 |

FOREIGN PATENT DOCUMENTS

| JP | 2010263255 A | 11/2010 |
| JP | 2013042424 A | 2/2013 |

* cited by examiner

*Primary Examiner* — Abdelaaziz Tissire
(74) *Attorney, Agent, or Firm* — Rossi, Kimms & McDowell LLP

(57) ABSTRACT

The interchangeable lens apparatus includes a memory to store first correction information to be used to correct focus state information on a focus state of its image capturing optical system, the focus state being detected in the image capturing apparatus by using a signal from an image sensor thereof, and a lens calculator configured to produce, by performing an interpolation process on the first correction information by using image sensor information that is information on the image sensor and received from the image capturing apparatus, second correction information corresponding to the image sensor information. The lens calculator sends the second correction information to the image capturing apparatus in a case where the lens calculator performs the interpolation process and sends the first correction information to the image capturing apparatus in a case where the image capturing apparatus performs the interpolation process.

16 Claims, 8 Drawing Sheets

|  |  | SET PUPIL DISTANCE PD | |
|---|---|---|---|
|  |  | PDmin | PDmax |
| PIXEL SIZE (PIXEL PITCH) S | Smax | A | B |
|  | Smin | C | D |

FIG. 5A

APERTURE VALUE F, SET PUPIL DISTANCE PD AND PIXEL SIZE S

| ZOOM (ZS) \ FOCUS (FS) | 0 | 1 | 2 | ... | FSmax |
|---|---|---|---|---|---|
| 0 | $C_0(0,0)$ <br> ⋮ <br> $C_{y4}(0,0)$ | $C_0(1,0)$ <br> ⋮ <br> $C_{y4}(1,0)$ | $C_0(2,0)$ <br> ⋮ <br> $C_{y4}(2,0)$ | ... | $C_0(Fsmax,0)$ <br> ⋮ <br> $C_{y4}(FSmax,0)$ |
| 1 | $C_0(0,1)$ <br> ⋮ <br> $C_{y4}(0,1)$ | $C_0(1,1)$ <br> ⋮ <br> $C_{y4}(1,1)$ | $C_0(2,1)$ <br> ⋮ <br> $C_{y4}(2,1)$ | ... | $C_0(Fsmax,1)$ <br> ⋮ <br> $C_{y4}(FSmax,1)$ |
| 2 | $C_0(0,2)$ <br> ⋮ <br> $C_{y4}(0,2)$ | $C_0(1,2)$ <br> ⋮ <br> $C_{y4}(1,2)$ | $C_0(2,2)$ <br> ⋮ <br> $C_{y4}(2,2)$ | ... | $C_0(FSmax,2)$ <br> ⋮ <br> $C_{y4}(FSmax,2)$ |
| ⋮ | ⋮ | ⋮ | ⋮ | ⋱ | ⋮ |
| ZSmax | $C_0(0,ZSmax)$ <br> ⋮ <br> $C_{y4}(0,ZSmax)$ | $C_0(1,ZSmax)$ <br> ⋮ <br> $C_{y4}(1,ZSmax)$ | $C_0(2,ZSmax)$ <br> ⋮ <br> $C_{y4}(2,ZSmax)$ | ... | $C_0(FSmax,ZSmax)$ <br> ⋮ <br> $C_{y4}(FSmax,ZSmax)$ |

| SET PUPIL DISTANCE / PIXEL SIZE | PDmin | PDmax |
|---|---|---|
| Smax | A | C |
| Smin | B | D |

LENS APPARATUS AND IMAGE CAPTURING APPARATUS

BACKGROUND OF THE INVENTION

Field of the Invention

The present invention relates to an interchangeable lens apparatus having a function of correcting information its image capturing optical system detected by using a signal output from an image sensor and to a lens-interchangeable image capturing apparatus.

Description of the Related Art

Lens-interchangeable image capturing apparatuses includes ones each capable of detecting information on an image capturing optical system of a lens apparatus (interchangeable lens) by using a signal from its image sensor. Examples of those include a lens-interchangeable image capturing apparatus including an image sensor provided with multiple focus detection pixels and photoelectrically converting an object image to produce a captured image and being capable of detecting a focus state of the image capturing optical system by a phase difference detection method using signals from the focus detection pixels (the method is hereinafter referred to as "an imaging-surface phase difference detection method").

In the imaging-surface phase difference detection method, a light flux received by the focus detection pixels producing focus detection signals (image signals) to be used for focus detection and a light flux received by image capturing pixels producing image capturing signals for producing a captured image or a captured video are mutually different. For this reason, influences of aberrations (e.g., spherical aberration, astigmatism and coma aberration) of the image capturing optical system on the focus detection signals and those on the image capturing signals are mutually different. The difference may cause a difference between an in-focus position calculated from the focus detection signals and a best in-focus position shown by the image capturing signals. Furthermore, depending on a set pupil distance of micro lenses each provided for each focus detection pixel in the image sensor, a size of each pixel and others, influence degrees of the aberrations on the focus detection signals are mutually different.

For such a difference in the influence degrees of the aberrations on the focus detection signals, Japanese Patent Laid-Open No. 2010-263255 discloses a method of storing data of chromatic aberration of magnification in a lens apparatus and converting the stored data, by an image capturing apparatus, into data that reflects number of pixels of its image sensor and a pixel pitch thereof to perform correction of the chromatic aberration of magnification. Japanese Patent Laid-Open No. 2010-263255 also discloses that the data on the chromatic aberration of magnification that vary depending on lens states (focal length, image capturing distance, aperture value and the like) are decimated for interpolation in order to decrease a storage amount of the lens apparatus. In this case, performing an interpolation calculation by the lens apparatus or the image capturing apparatus enables acquiring data on the chromatic aberration of magnification depending on various lens states.

Furthermore, Japanese Patent Laid-Open No. 2013-042424 discloses a method of storing, in a ROM, an expression including an image height as a parameter to calculate a degree of marginal light quantity reduction, sending information on the marginal light quantity reduction calculated at the respective image heights by using the expression to an image capturing apparatus and then causing the image capturing apparatus to correct the marginal light quantity reduction.

The data on the chromatic aberration of magnification and on the marginal light quantity reduction disclosed in Japanese Patent Laid-Open Nos. 2010-263255 and 2013-042424 are data uniquely depending on image capturing conditions such a focal length of an image capturing optical system and an image capturing distance. For this reason, even when mutually different image sensors are used, amounts of the correction for the chromatic aberration of magnification and the marginal light quantity reduction can be calculated from the data uniquely depending on the image capturing conditions.

However, the correction amount corresponding to a difference between the in-focus position acquired from the focus detection signals and the best in-focus position acquired from the image capturing signals is difficult to be calculated for the different image sensors. This fact requires the lens apparatus to have correction values for individual image capturing apparatuses (that is, for individual image sensors), which increases in storage amount required by a storage medium to store the correction values.

SUMMARY OF THE INVENTION

The present invention provides a lens apparatus and an image capturing apparatus each capable of appropriately correcting information on an image capturing optical system depending on an image sensor while suppressing an increase in storage amount.

The present invention provides as an aspect thereof a lens apparatus configured to be detachably attached to an image capturing apparatus including an image sensor and configured to communicate with the image capturing apparatus. The lens apparatus includes an image capturing optical system to form an object image to be photoelectrically converted by the image sensor, a memory configured to store first correction information to be used to correct focus state information that is information on a focus state of the image capturing optical system, the focus state being detected in the image capturing apparatus by using a signal from the image sensor, and a lens calculator configured to produce, by performing an interpolation process on the first correction information by using image sensor information that is information on the image sensor and received from the image capturing apparatus, second correction information corresponding to the image sensor information. The lens calculator is configured to send the second correction information to the image capturing apparatus in a case where the lens calculator performs the interpolation process and to send the first correction information to the image capturing apparatus in a case where the image capturing apparatus performs the interpolation process.

The present invention provides as another aspect thereof an image capturing apparatus configured to allow a detachable attachment of a lens apparatus including an image capturing optical system to form an object image and configured to communicate with the lens apparatus. The image capturing apparatus includes an image sensor configured to photoelectrically convert the object image, a detector configured to detect focus state information that is information on a focus state of the image capturing optical system by using a signal from the image sensor, and a camera calculator configured to receive, from the lens apparatus, first correction information to be used to correct the focus state information and configured to produce second correction information by performing an interpolation process on the first correction information by using image sensor information that is information on the image sensor. The camera calculator is configured to receive the second correction information from the lens apparatus in a case where the lens apparatus performs the interpolation process and to receive the first correction information from the lens apparatus in a case where the camera calculator performs the interpolation process.

The present invention provides as still another aspect thereof a non-transitory computer-readable recording medium storing a program configured to cause a computer in a lens apparatus to perform a process. The lens apparatus is configured to be detachably attached to an image capturing apparatus including an image sensor, configured to communicate with the image capturing apparatus, includes an image capturing optical system to form an object image to be photoelectrically converted by the image sensor and storing first correction information to be used to correct focus state information that is information on a focus state of the image capturing optical system detected in the image capturing apparatus by using a signal from the image sensor. The process including producing, by performing an interpolation process on the first correction information by using image sensor information that is information on the image sensor and received from the image capturing apparatus, second correction information corresponding to the image sensor information. The process further includes sending the second correction information to the image capturing apparatus in a case where the computer performs the interpolation process, and sending the first correction information to the image capturing apparatus in a case where the image capturing apparatus performs the interpolation process.

The present invention provides as yet another aspect thereof a non-transitory computer-readable recording medium storing a program configured to cause a computer in an image capturing apparatus to perform a process. The image capturing apparatus is configured to allow a detachable attachment of a lens apparatus including an image capturing optical system to form an object image, configured to communicate with the lens apparatus, includes an image sensor configured to photoelectrically convert the object image and being configured to detect focus state information that is information on a focus state of the image capturing optical system by using a signal from the image sensor. The process includes receiving, from the lens apparatus, first correction information to be used to correct the focus state information; and producing second correction information by performing an interpolation process on the first correction information by using image sensor information that is information on the image sensor. The process further includes receiving the second correction information from the lens apparatus in a case where the lens apparatus performs the interpolation process, and receiving the first correction information from the lens apparatus in a case where the computer performs the interpolation process.

Further features of the present invention will become apparent from the following description of exemplary embodiments with reference to the attached drawings.

BRIEF DESCRIPTION OF THE DRAWINGS

FIGS. 5A and 5B illustrate an array of first correction information in the embodiment.

FIGS. 6A and 6B illustrate an array of the first correction information in the embodiment.

DESCRIPTION OF THE EMBODIMENTS

Exemplary embodiments of the present invention will be described below with reference to the attached drawings.

Figure 1:
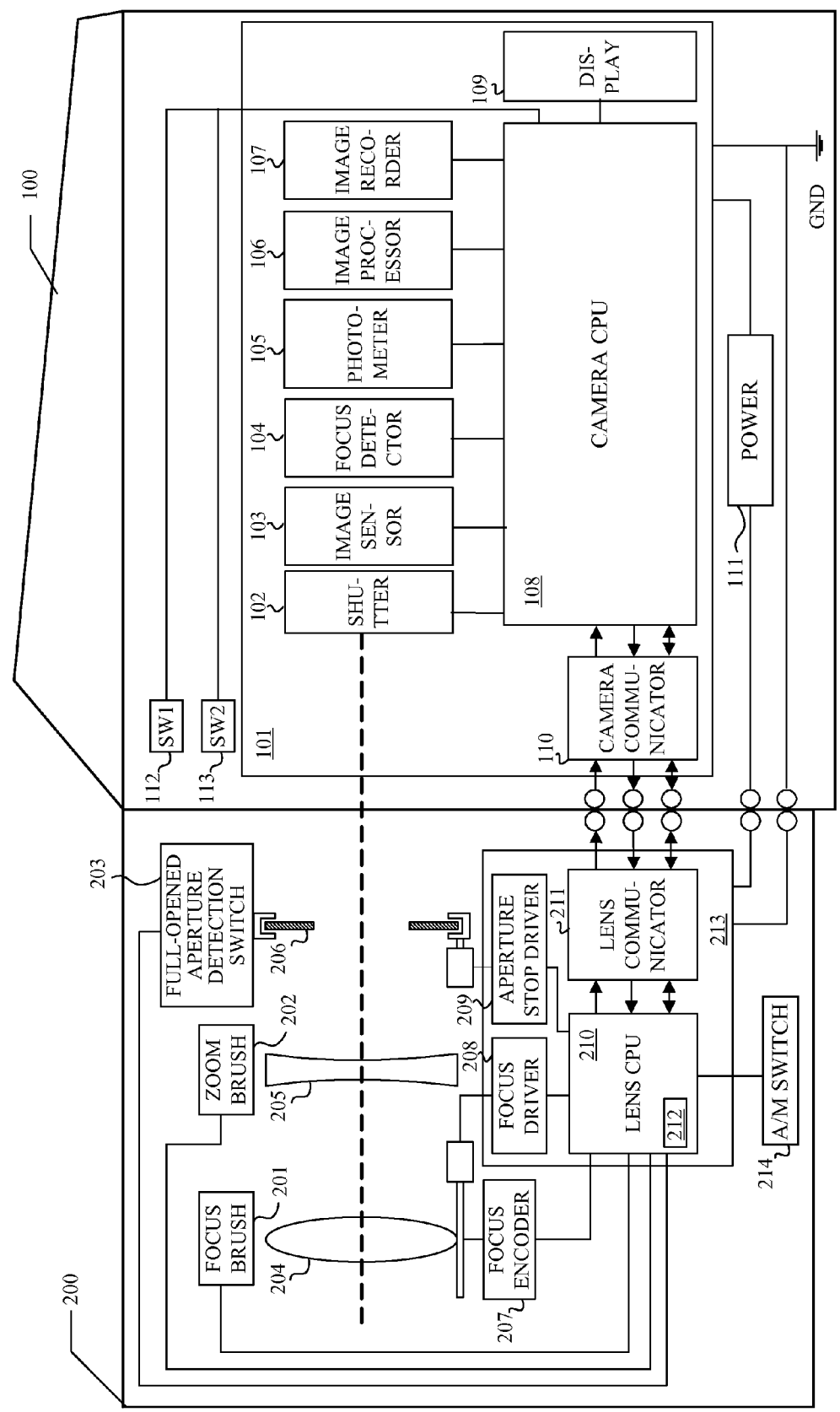
FIG. 1 is a block diagram illustrating a configuration of an image capturing system constituted by an interchangeable lens that is an embodiment of the present invention and a camera.

FIG. 1 illustrates a configuration of an image capturing system including a lens apparatus (hereinafter referred to as "an interchangeable lens") 200 that is an embodiment of the present invention and an image capturing apparatus (hereinafter referred to as "a camera body") 100 to which the interchangeable lens 200 is detachably attached.

In the camera body 100, an electric circuit 101 includes a shutter 102, an image sensor 103, a focus detector 104 as a detector, a photometer 105, an image processor 106 as an image producer 106 and an image recorder 107. The electric circuit 101 further includes a camera CPU 108 as a camera calculator, a display 109 and a camera communicator 110.

The shutter 102 performs an opening/closing operation to control an exposure amount of the image sensor 103. The image sensor 103 is a photoelectric conversion element that photoelectrically converts an object image formed by a light flux passing through the interchangeable lens 200, the image sensor 103 being constituted by a CCD sensor or a CMOS sensor.

The focus detector 104 detects, by using focus detection signals that are outputs from multiple focus detection pixels provided to the image sensor 103, a focus state (defocus amount) of an image capturing optical system included in the interchangeable lens 200 as information on the image capturing optical system. This focus state detection (hereinafter referred to also as "focus detection") is performed by a phase difference detection method described below. First, on an image capturing frame, a focus detection area is selected arbitrary by a user or automatically according to a selection algorithm. In the focus detection area, two or more focus detection pixels each including paired photoelectric converters are included. Performing a correlation calculation on paired focus detection signals (image signals) acquired from each of the focus detection pixels provides a phase difference between the image signals, and from the phase difference the defocus amount as a focus state detection result is calculated.

Figure 8:
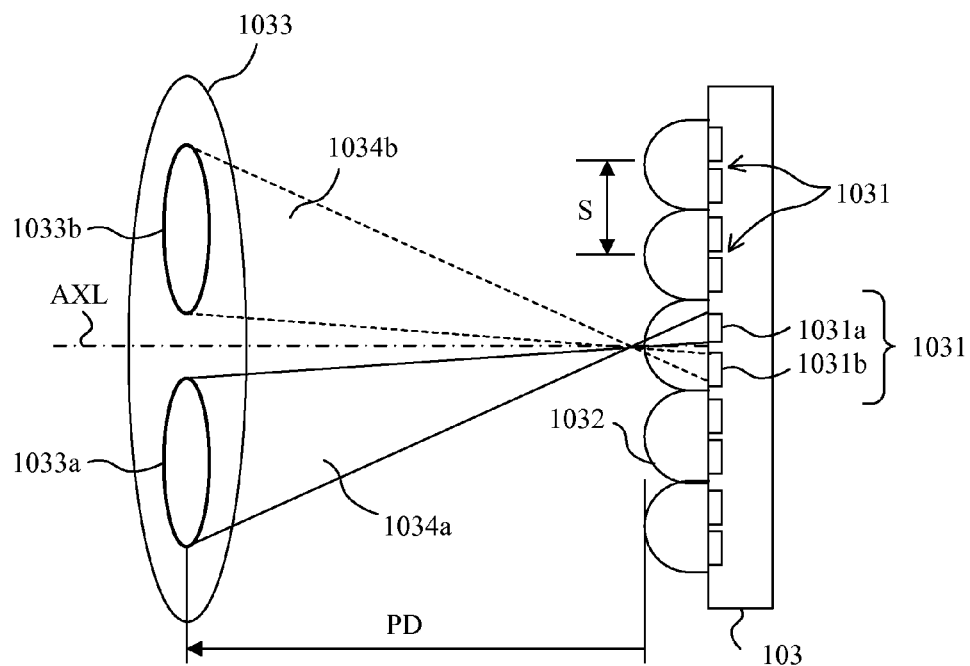
FIG. 8 illustrates a set pupil distance of the image sensor of the camera.

FIG. 8 illustrates micro lenses 1032 each provided to each focus detection pixel 1031 of the image sensor 103. As described above, on the image sensor 103, the multiple focus detection pixels 1031 (micro lenses 1032) are arranged at a predetermined pitch S. In the following description, the pitch S is referred to as a pixel size S. Although FIG. 8 illustrates only the focus detection pixels 1031 on the image sensor 103, image capturing pixels described later are also arranged thereon together with the focus detection pixels 1031.

Each focus detection pixel 1031 is provided with paired photoelectric converters 1031a and 1031b. An exit pupil 1033 of the image capturing optical system (optical axis AXL) is located at a position distant on an object side by a distance PD from the micro lens 1032 arranged on a designed image forming surface of the image capturing optical system. The distance PD is set depending on a curvature and a refractive index of the micro lens 1032, on a distance between the micro lens 1032 and the corresponding focus detection pixel 1031 and others. In the following description, the set distance PD is referred to as a set pupil distance PD (of the image sensor or the micro lens). Each micro lens 1032 causes light fluxes 1034a and 1034b from mutually different paired areas 1033a and 1033b in the exit pupil 1033 to respectively enter the paired photoelectric converters 1031a and 1031b in each focus detection pixel 1031. That is, each micro lens 1032 performs pupil division, which enables the focus detection by the phase difference detection method.

The photometer 105 measures a light amount (luminance) of the light flux passing through the interchangeable lens 200, by using output (image capturing signals described later) from the image sensor 103.

The image processor 106 performs various processes on the image capturing signals outputs from a predetermined number of the image capturing pixels provided to the image sensor 103 to produce a captured image. The various processes include processes using lens image process information provided to the interchangeable lens 200 and camera image process information provided to the camera body 100.

The camera CPU 108 controls operations of the image sensor 103 and the above-described constituent components (denoted by reference numerals 102 to 109). The camera CPU 108 is capable of communicating with a lens CPU (lens calculator) 210 via the camera communicator 110 and a lens communicator 211 provided to the interchangeable lens 200. The display 109 performs display of information on image capturing and the captured image and others.

The camera CPU 108 calculates, depending on the luminance acquired from the photometer 105, an aperture value and a shutter speed for image capturing and sends an aperture stop drive command containing the aperture value for driving an aperture stop 206 to the lens CPU 210.

In addition, the camera CPU 108 acquires the defocus amount calculated by the focus detector 104 and calculates, depending on the defocus amount, a drive direction in which and a drive amount by which a focus lens 204 included in the image capturing optical system is driven toward an in-focus position thereof, namely, a position where an in-focus state is acquired for the object. Thereafter, the camera CPU 108 sends a focus drive command containing information on the drive direction and the drive amount to the lens CPU 210. Depending on the focus drive command, the lens CPU 210 controls a focus driver 208 so as to move the focus lens 204 to the in-focus position. In this manner, autofocus (AF) control is performed.

Description will be made of a process performed by the camera CPU 108 for the AF control, with reference to a flowchart of FIG. 2. This process is executed by the camera CPU 108 as a computer according to an AF control program as a computer program. The camera CPU 108 starts the process at STEP 001 and then proceeds to STEP 002.

At STEP 002, the camera CPU 108 causes the focus detector 104 to perform a focus detection operation to calculate a defocus amount Def and acquires the defocus amount Def.

Next, at STEP 003 (correction value calculation step), the camera CPU 108 calculates a correction value ΔDef to be used to correct the defocus amount Def. Details of a method of calculating the correction value ΔDef will be described later.

Next, at STEP 004, the camera CPU 108 corrects the defocus amount Def by using the correction value ΔDef. Specifically, the camera CPU 108 calculates a value of Def-ΔDef and thereby acquires a corrected defocus amount Def1.

Subsequently, at STEP 005, the camera CPU 108 compares an absolute value of the corrected defocus amount Def1 with a predetermined value. If the absolute value of the corrected defocus amount Def1 is larger than the predetermined value, the camera CPU 108 proceeds to STEP 006. If the absolute value of the corrected defocus amount Def1 is equal to or smaller than the predetermined value, the camera CPU 108 regards an in-focus state as being acquired to proceed to STEP 007, and then ends this process.

At STEP 006, the camera CPU 108 calculates a drive direction and a drive amount of the focus lens 204 depending on the corrected defocus amount Def1 and sends a focus drive command containing the drive direction and amount to the lens CPU 210. Upon receipt of the focus drive command, the lens CPU 210 controls the focus driver 208 to cause it to drive the focus lens 204 in the drive direction and by the drive amount both specified by the focus drive command. Thereafter, the camera CPU 108 returns to STEP 002 and repeats the process until the corrected defocus amount Def1 becomes equal to or less than the predetermined value at STEP 005.

In the camera body 100, a power source 111, an image capturing preparation switch (SW1) 112, an image capturing start switch (SW2) 113 and an image recorder 107 are provided. The power source 111 supplies power to the electric circuit 101 in the camera body 100 and an electric circuit 213 in the interchangeable lens 200. In response to a turning-on of the image capturing preparation switch (SW1) 112 by a user, the camera CPU 108 causes the photometer 105 to perform a photometric operation and causes the focus detector 104 to perform the focus detection operation.

In response to a turning-on of the image capturing start switch (SW2) 113 by the user, the camera CPU 108 performs the following operations by regarding an image capturing command as being input. First, the camera CPU 108 sends, to the lens CPU 210, an aperture stop drive command for driving the aperture stop 206 to an aperture value set for image capturing and causes the shutter 102 to perform a shutter operation so as to expose the image sensor 103 at a predetermined shutter speed. Then, the camera CPU 108 causes the image processor 106 to produce a recording image (captured image), by using the image capturing signals acquired from the image capturing pixels of the image sensor 103.

That is, in this embodiment, the image sensor 103 is used not only to acquire the recording image, but also to calculate the defocus amount. The above-described AF by the phase difference detection method performed using the image sensor for acquiring the recording image is referred to also as "imaging-surface phase difference AF". Furthermore, the camera CPU 108 causes the image recorder 107 to record, in a recording medium (not illustrated) such as a semiconductor memory, the recording image. This series of image capturing operations including the exposure, the image producing and the recording is referred to also as "a release process".

The interchangeable lens 200 includes the image capturing optical system constituted by the focus lens 204, a magnification-varying lens 205 and the aperture stop 206, a focus brush 201, a zoom brush 202 and a full-opened aperture detection switch 203. The interchangeable lens 200 further includes a focus encoder 207, the electric circuit 213 and an A/M switch 214.

The focus lens 204 is moved in an optical axis direction to perform focusing. The magnification-varying lens 205 is moved in the optical axis direction to vary a focal length of the image capturing optical system. The aperture stop 206 forms an aperture whose diameter (aperture value) is variable and varies the diameter thereof to control a light amount.

The focus brush 201 is moved on a gray code plate (not illustrated) and outputs an electrical signal depending on a position of the focus brush 201. This operation enables detecting a position of the focus lens 204. In a same way as that just described, the zoom brush 202 is moved on a gray code plate (not illustrated) and outputs an electrical signal depending on a position of the zoom brush 202. This operation enables detecting a position of the magnification-varying lens 205.

The full-opened aperture detection switch 203 is a switch to determine whether or not the aperture stop 206 is in a full-opened state. The focus encoder 207 is an encoder to detect the position of the focus lens 204 at a resolution higher than that of the focus brush 201. The A/M switch 214 is a switch to switch a focus mode between an autofocus mode and a manual focus mode.

The electric circuit 213 includes the lens communicator 211, the lens CPU 210, the focus driver 208 and an aperture stop driver 209. The lens CPU 210 outputs, to the focus driver 208, a focus lens drive signal depending on the focus drive command received from the camera CPU 108 via the camera communicator 110 and the lens communicator 211. The focus driver 208 includes an actuator such as a stepping motor, a vibration-type motor or a voice coil motor and drives the focus lens 204 depending on the focus lens drive signal from the lens CPU 210. This operation moves the focus lens 204 to the in-focus position. This series of operations from the receipt of the focus drive command to the drive of the focus lens 204 to the in-focus position is referred to as "a lens side AF process".

The lens CPU 210 outputs, to the aperture stop driver 209, an aperture stop drive signal depending on the aperture stop drive command. The aperture stop driver 209 includes an actuator such as a stepping motor and drives the aperture stop 206 depending on the aperture stop drive signal from the lens CPU 210.

Furthermore, the lens CPU 210 stores, in a memory 212 provided therein, focal position deviation information that is correction information (first correction information) used to correct the defocus amount as a focus detection result. The focal position deviation information is information unique to the interchangeable lens 200 (image capturing optical system). The memory 212 may be provided outside of the lens CPU 210. The lens CPU 210 sends the focal position deviation information to the camera CPU 108 via the lens communicator 211 and the camera communicator 110.

The camera CPU 108 corrects the defocus amount acquired from the focus detector 104, by using the focal position deviation information. This correction matches a best image surface position of the image capturing optical system in which the focus lens 204 is moved to the in-focus position by the AF with an imaging surface of the image sensor 103

The best image surface position of the image capturing optical system varies depending on aberration (particularly, spherical aberration) generated in the image capturing optical system. The aberration varies depending on the position of the magnification-varying lens 205, the position of the focus lens 204 and the aperture value of the aperture stop 206. Accordingly, the focal position deviation information has a value changing depending on the positions of the focus lens 204 and the magnification-varying lens 205 and the aperture value of the aperture stop 206. Furthermore, an influence degree of the aberration generated in the image capturing optical system is different depending also on a configuration of the image sensor in the camera body 100. For this reason, it is necessary to use different focal position deviation information for the defocus amount correction depending on types of image sensors in camera bodies to which the interchangeable lens 200 can be attached.

In this embodiment, as illustrated in FIG. 5A, the focal position deviation information is stored in the memory 212 as a two-dimensional array (data structure) defined by the pixel size S and the set pupil distance PD of the image sensor and contains four elements A, B, C and D. Although this embodiment will describe a case where the four elements, which are a least number of elements as a two-dimensional array, are stored in the memory 212 in order to reduce a required storage amount of the memory 212, a greater number of the elements may be included in the two-dimensional array.

Each element (focal position deviation information) contains six correction coefficients each corresponding to a combination of the position (focus state) FS of the focus lens 204, the position (zoom state) ZS of the magnification-varying lens 205, the aperture value F, the set pupil distance PD of the image sensor and the pixel size S of the image sensor:

C0 (FS, ZS, F, PD, S)
Cx2 (FS, ZS, F, PD, S)
Cy2 (FS, ZS, F, PD, S)
Cx4 (FS, ZS, F, PD, S)
Cx2y2 (FS, ZS, F, PD, S)
Cy4 (FS,ZS,F,PD,S).

Figure 6A:
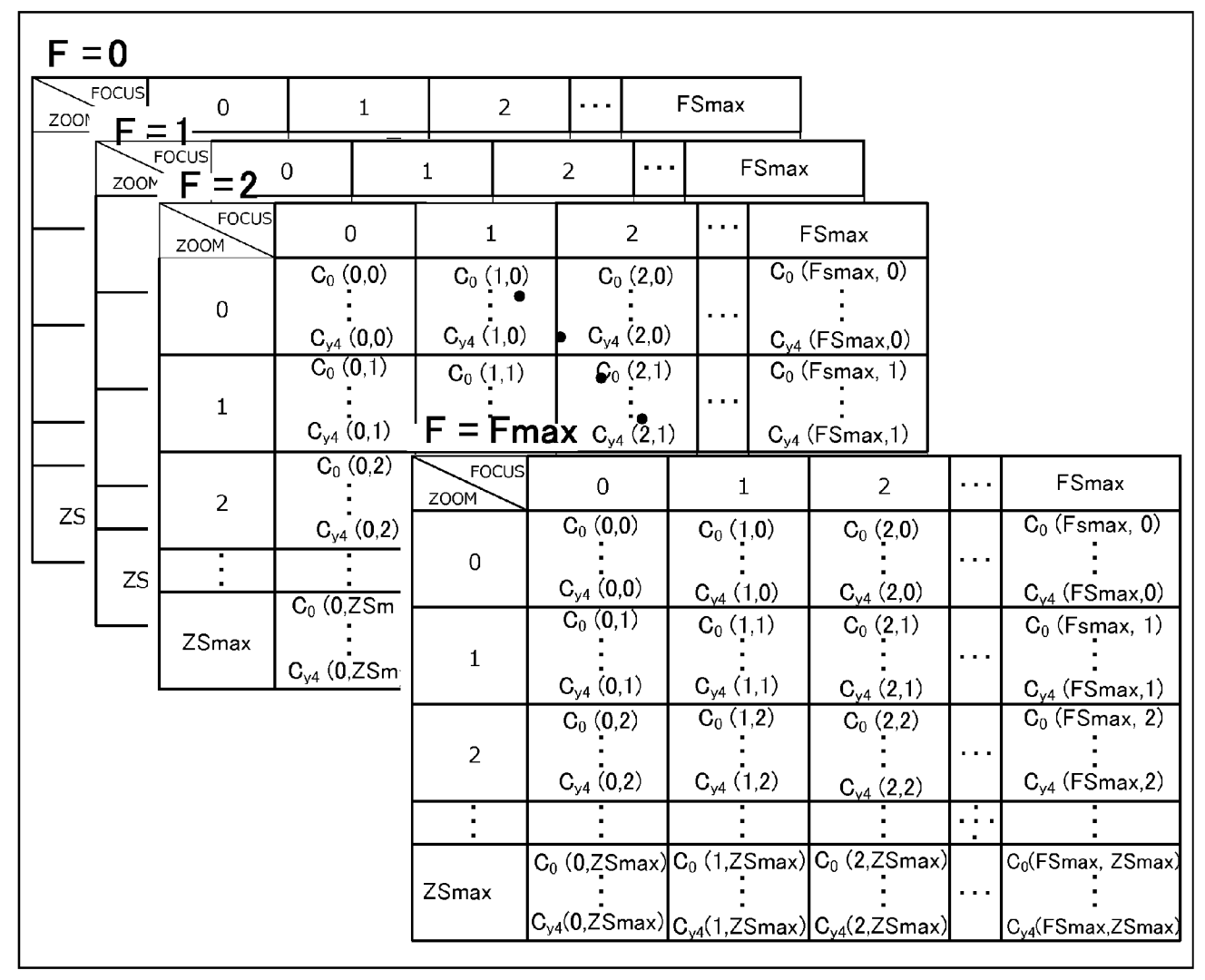

That is, the six correction coefficients C0 to Cy4 are provided, as illustrated in FIG. 5B, as a two-dimensional array defined by the focus state FS and the zoom state ZS, and the two-dimensional array is provided, as illustrated in FIG. 6A, for each of the largest possible number of the aperture values F (that is, as a three-dimensional array). The three-dimensional array is stored in the memory 212, as illustrated in FIG. 6B, as each of the four elements A, B, C and D two-dimensionally arrayed.

Figure 3:
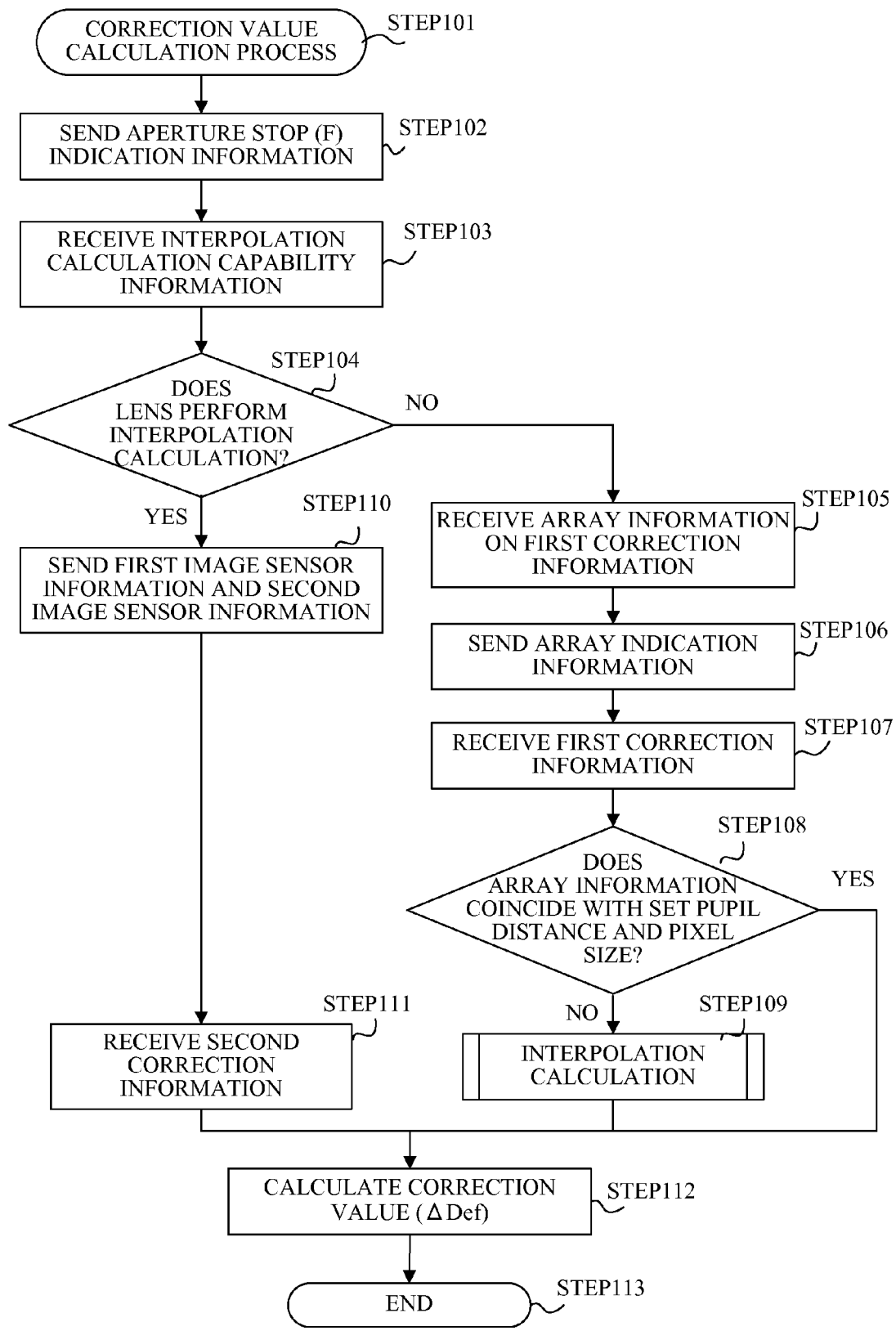
FIG. 3 is a flowchart illustrating a correction value calculation process performed by the camera in the embodiment.
Figure 4:
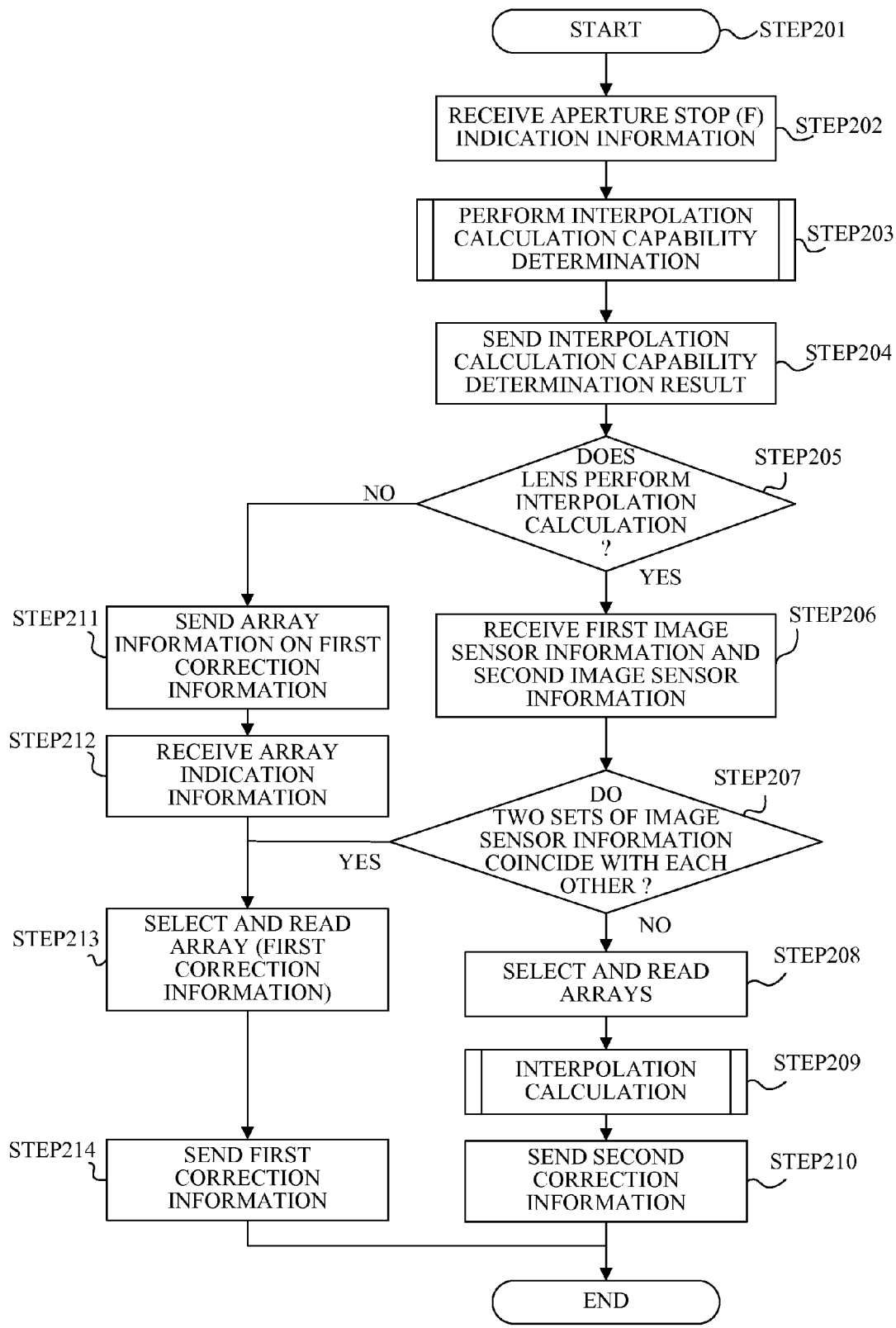
FIG. 4 is a flowchart illustrating a correction value calculation process performed by the interchangeable lens in the embodiment.

Next, with reference to flowcharts of FIGS. 3 and 4, description will be made of processes of calculating the correction value ΔDef to be used for correcting the defocus amount Def. FIG. 3 illustrates a correction value calculation process performed by the camera CPU 108, and FIG. 4 illustrates a correction value calculation process performed by the lens CPU 210. These calculation processes are respectively executed by the camera CPU 108 and the lens CPU 210, each of which is a computer, according to correction value calculation process programs as computer programs. The communication between the camera CPU 108 and the lens CPU 210 is, as mentioned above, performed via the camera communicator 110 and the lens communicator 211, description thereof is omitted below.

Figure 2:
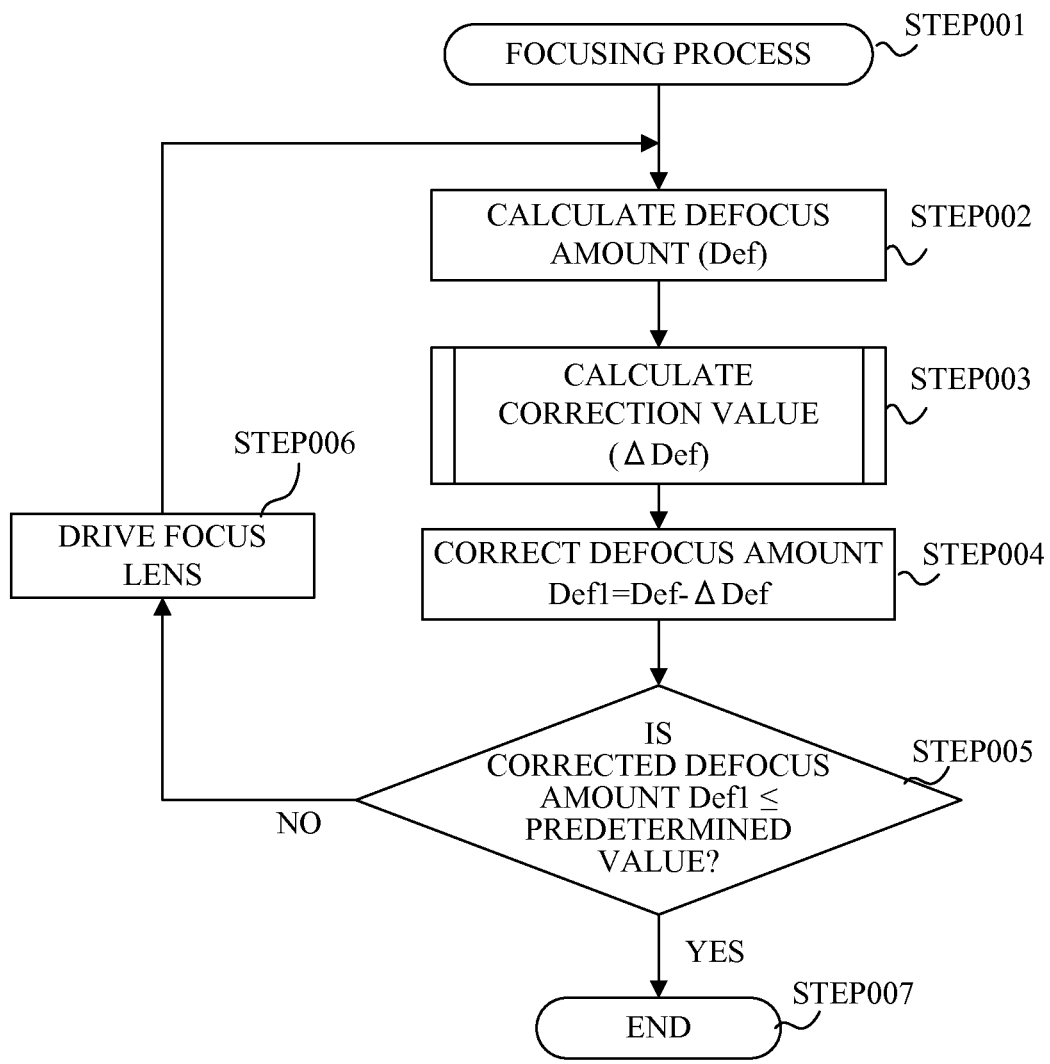
FIG. 2 is a flowchart illustrating an autofocus operation in the embodiment.

Upon proceeding to the correction value calculation process step shown as STEP 003 of FIG. 2, the camera CPU 108 starts the correction value calculation process from STEP 101 of FIG. 3 and proceeds to STEP 102.

At STEP 102, the camera CPU 108 sends, to the lens CPU 210, aperture stop indication information corresponding to the aperture value F set for the image capturing. On the other hand, the lens CPU 210 starts the process from STEP 201 of FIG. 4 and receives, at STEP 202, the aperture stop indication information from the camera CPU 108. The received aperture stop indication information is used as one of information for table selection in reading of information from the data table.

Subsequently, at STEP 203, the lens CPU 210 performs a determination of capability of an interpolation calculation (interpolation process). That is, the lens CPU 210 determines whether the interchangeable lens 200 (lens CPU 210) or the camera body 100 (camera CPU 108) performs the interpolation calculation described later. The determination of capability of the interpolation calculation is hereinafter referred to as "an interpolation calculation capability determination".

In this embodiment, as a method of the interpolation calculation capability determination, the lens CPU 210 compares a period of time required by the lens CPU 210 to perform the interpolation calculation and that required by the camera CPU 108 to perform the interpolation calculation. When acquiring a comparison result showing that the period of time required by the lens CPU 210 is shorter than that required by the camera CPU 108, the lens CPU 210 determines that the lens CPU 210 performs (can perform) the interpolation calculation. On the other hand, when acquiring a comparison result showing that the period of time required by the camera CPU 108 is shorter than that required by the lens CPU 210, the lens CPU 210 determines that the lens CPU 210 does not (cannot) perform the interpolation calculation. For this determination performed by the lens CPU 210, the period of time required by the camera CPU 108 for the interpolation calculation may be prestored in the memory 212 in the lens CPU 210 or may be received from the camera CPU 108 through communication therewith.

Instead of this determination method, a method may be used in which the memory 212 prestores information (interpolation process capability information) on whether or not the lens CPU 210 can perform the interpolation process as information based on a calculation ability of the lens CPU 210, and the lens CPU 210 performs the interpolation calculation capability determination depending on the prestored information.

At STEP 204, the lens CPU 210 sends a result of the interpolation calculation capability determination performed at STEP 203 to the camera CPU 108. At STEP 103, the camera CPU 108 receives information on the interpolation calculation capability determination result from the lens CPU 210. Thereafter, at STEP 104, when the received capability determination result shows that the lens CPU 210 performs the interpolation calculation, the camera CPU 108 proceeds to STEP 110. When the determination result shows that the lens CPU 210 does not perform the interpolation calculation, the camera CPU 108 proceeds to STEP 105. On the other hand, at STEP 205, when the interpolation calculation capability determination result shows that the lens CPU 210 performs the interpolation calculation, the lens CPU 210 proceeds to STEP 206. When the interpolation calculation capability determination result shows that the lens CPU 210 does not perform the interpolation calculation, the lens CPU 210 proceeds to STEP 211.

Description will be made of a process performed when the interpolation calculation capability determination result at STEP 203 shows that the lens CPU 210 does not perform the interpolation calculation.

At STEP 211, the lens CPU 210 sends, to the camera CPU 108, array information that is information on the array of the focal position deviation information (first correction information) stored in the memory 212. The array information herein means the pixel size (first image sensor information) S and the set pupil distance (second image sensor information) PD of the image sensor to both of which the array corresponds. Specifically, the lens CPU 210 sends the pixel size S and the set pupil distance PD of the image sensor corresponding to a three-dimensional array stored in the memory 212 among the four three-dimensional arrays A to D (each hereinafter referred to simply as "an array") illustrated in FIG. 5A. This is because all of multiple interchangeable lenses attachable to the camera body 100 as the interchangeable lens 200 do not necessarily store all of the four arrays A to D and therefore the multiple interchangeable lenses possibly include an interchangeable lens storing, for example, only A and C.

On the other hand, at STEP 105, the camera CPU 108 receives the array information from the lens CPU 210. Thereafter, at STEP 106, the camera CPU 108 sends array indication information to the lens CPU 210. The array indication information is information indicating a specific array among the arrays A to D illustrated in FIG. 5A; the specific array is required by the camera CPU 108 to be sent from the lens CPU 210.

In the camera CPU 108, as image sensor information which is information on the image sensor 103, information on the pixel size and the set pupil distance of the image sensor 103 is stored. The camera CPU 108 derives, from the information on the pixel size and the set pupil distance, data of one (specific array) of the arrays A to D which enables performing the interpolation calculation and then produces the array indication information indicating the specific array. When the array components A to D include the specific array corresponding to the set pupil distance and the pixel size of the image sensor 103, the camera CPU 108 produces the array indication information indicating only the data of the specific array.

At STEP 212, the lens CPU 210 receives the array indication information from the camera CPU 108.

Thereafter, at STEP 213, the lens CPU 210 reads, from the memory 212, the focal position deviation information as the specific array indicated by the array indication information and, at STEP 214, sends the read focal position deviation information to the camera CPU 108. Thereafter, at STEP 215, the lens CPU 210 ends the process thereof.

At STEP 107, the camera CPU 108 receives the focal position deviation information (written as "FIRST CORRECTION INFORMATION" in the drawing) from the lens CPU 210. Then, at STEP 108, the camera CPU 108 determines whether or not the set pupil distance and the pixel size corresponding to the specific array in the array information received at STEP 105 coincide with the set pupil distance and the pixel size of the image sensor 103. If the set pupil distance and the pixel size in the array information coincide with those of the image sensor 103, the camera CPU 108 proceeds to STEP 112 to calculate the correction value ΔDef from the received focal position deviation information. If not, the camera CPU 108 proceeds to STEP 109 to calculate interpolated focal position deviation information (written as "SECOND CORRECTION INFORMATION" in the drawing) by the interpolation calculation using the received focal position deviation information as the second correction information.

Description will be made below of the calculation of the interpolated focal position deviation information, namely, the interpolation calculation performed by the camera CPU 108 at STEP 109. The camera CPU 108 receives, from the lens CPU 210, the multiple arrays (A to D in this embodiment) showing the focal position deviation information to be used to perform the interpolation calculation.

Figure 7:
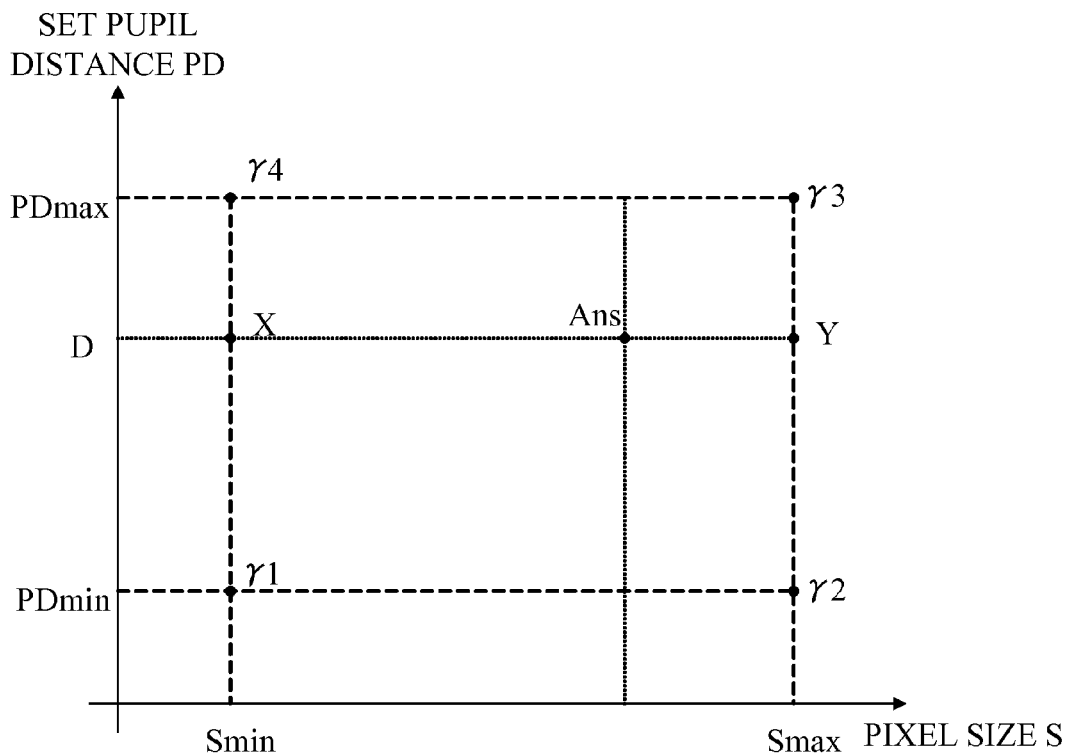
FIG. 7 illustrates an interpolation process in the embodiment.

FIG. 7 is a conceptual view of the interpolation calculation for calculating an interpolated array by using the arrays A to D. In FIG. 7, a vertical axis and a horizontal axis respectively show the pixel size and the set pupil distance, and one correction coefficient contained in each of the arrays A, B, C and D is shown as:

$$\gamma_1 = (S_{min}, PD_{min})$$

$$\gamma_2 = (S_{max}, PD_{min})$$

$$\gamma_3 = (S_{max}, PD_{max})$$

$$\gamma_4 = (S_{min}, PD_{max}).$$

In this case, when $(S_{min}, PD) = X$ and $(S_{max}, PD) = Y$, following expression (1) holds on a basis of a ratio between the set pupil distances:

$$\frac{X - \gamma_1}{\gamma_4 - \gamma_1} = \frac{PD - PD_{min}}{PD_{max} - PD_{min}}. \quad (1)$$

As a result, following expression (2) is derived:

$$X = \frac{PD - PD_{min}}{PD_{max} - PD_{min}}(\gamma_4 - \gamma_1) + \gamma_1. \quad (2)$$

Similarly, following expression (3) is derived:

$$Y = \frac{PD - PD_{min}}{PD_{max} - PD_{min}}(\gamma_3 - \gamma_2) + \gamma_2. \quad (3)$$

When Ans represents a value (correction coefficient) to be calculated, following expression (4) is derived from the ratio between the pixel sizes:

$$\frac{Ans - X}{Y - X} = \frac{S - S_{min}}{S_{max} - S_{min}}. \quad (4)$$

This enables calculating the value Ans by using following expression (5):

$$Ans = \frac{S - S_{min}}{S_{max} - S_{min}}(Y - X) + X. \quad (5)$$

Performing these calculations for each of the correction coefficients C0, Cx2, Cy2, Cx4, Cx2y2 and Cy4 enables providing the interpolated focal position deviation information as the interpolated array.

Next, description will be made of a process performed in the case where the lens CPU 210 determines, at STEP 203, that the lens CPU 210 performs the interpolation calculation. In this case, the camera CPU 108 receives, at STEP 104, the information on the interpolation calculation capability determination result showing that the lens CPU 210 performs the interpolation calculation from the lens CPU 210 and therefore proceeds to STEP 111.

At STEP 111, the camera CPU 108 sends the pixel size S (written as "FIRST IMAGE SENSOR INFORMATION" in the drawing) and the set pupil distance PD (written as "SECOND IMAGE SENSOR INFORMATION" in FIG. 2) of the image sensor 103 to the lens CPU 210.

At STEP 206, the lens CPU 210 receives the pixel size S and the set pupil distance PD of the image sensor 103 from the camera CPU 108.

Then, at STEP 207, the lens CPU 210 determines whether or not the pixel size S and the set pupil distance PD received at STEP 206 coincide with the pixel size and the set pupil distance corresponding to any one of the arrays (focal position deviation information) A to D stored in the memory 212. If the pixel size S and the set pupil distance PD received at STEP 206 coincide with those in the one array, the lens CPU 210 proceeds to STEP 213 to read the one array from the memory 212. If not, the lens CPU 210 proceeds to STEP 208 to select and read two or more arrays (the four arrays A to D in this embodiment) corresponding to a pixel size and a set pupil distance respectively adjacent to the received pixel size S and set pupil distance PD.

Next, at STEP 209, the lens CPU 210 performs the interpolation calculation using the arrays A to D read at STEP 208 to calculate an interpolated array (interpolated focal position deviation information) as the second correction information corresponding to the received pixel size S and set pupil distance PD. This interpolation calculation is same as that performed by the camera CPU 108 at STEP 109 and therefore description thereof is omitted.

Thereafter, at STEP 210, the lens CPU 210 sends the interpolated focal position deviation information calculated at STEP 209 to the camera CPU 108 and, at STEP 215, ends the process thereof.

At STEP 111, the camera CPU 108 receives the interpolated focal position deviation information from the lens CPU 210 and then proceeds to STEP 112.

At STEP 112, the camera CPU 108 calculates the correction value ΔDef from the received interpolated focal position deviation information. Specifically, the camera CPU 108 performs the following calculation using the correction coefficients C0, Cx2, Cy2, Cx4, Cx2y2 and Cy4 acquired at STEP 109 to acquire the correction value ΔDef by representing a target in-focus position (coordinates) in the image capturing frame as (x,y):

$$\Delta Def = C0 + Cx2 \cdot x^2 + Cy2 \cdot y^2 + Cx4 \cdot x^4 + Cy4 \cdot y^4 + Cx2y2 \cdot x^2 \cdot y^2.$$

Then, at STEP 113, the camera CPU 108 ends the process thereof.

This embodiment enables calculating an appropriate value as the correction value ΔDef different depending on the image sensors (that is, depending on differences of the set pupil distance, the pixel size and others) of the camera bodies while suppressing an increase in the storage amount required in the interchangeable lens to store the focal position deviation information. This enables accurately correcting the focus detection result even when the camera bodies to which the interchangeable lens is attached include mutually different image sensors, which consequently provides a highly accurate in-focus state.

In other words, the above embodiment enables appropriately correcting the information on the image capturing optical system depending on the image sensor of the image capturing apparatus to which the lens apparatus is attached while suppressing an increase in the storage amount required in the lens apparatus.

Moreover, this embodiment determines whether the interchangeable lens or the camera body is suitable to perform the interpolation calculation on the focal position deviation information and performs the interpolation calculation depending on the result of the determination, which enables shortening a period of time required for the interpolation calculation and reducing a load of the calculation.

Although the above embodiment described the case where the lens CPU 210 performs the interpolation calculation capability determination and sends the determination result to the camera CPU 108, the camera CPU 108 may alternatively perform the interpolation calculation capability determination and send the determination result to the lens CPU 210. In this case, processes to be respectively performed by the lens CPU 210 and the camera CPU 108 depending on the determination result are same as those described in the embodiment.

Furthermore, although the above embodiment described the case of detecting, in the image capturing apparatus, the focus state information on the focus state of the image capturing optical system as the information on the image capturing optical system, the information on the image capturing optical system is not limited to such information on the focus state as long as the information can be detected by using the signal from the image sensor. For instance, this information may be information on lens aberration used for image restoration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-123084, filed on Jun. 16, 2014, which is hereby incorporated by reference herein in its entirety.

What is claimed is:

1. A lens apparatus configured to be detachably attached to an image capturing apparatus including an image sensor and configured to communicate with the image capturing apparatus, the lens apparatus comprising:
   an image capturing optical system configured to form an object image to be photoelectrically converted by the image sensor;
   a memory configured to store first correction information for correcting focus state information that is information on a focus state of the image capturing optical system, the focus state being detected in the image capturing apparatus by using a signal from the image sensor; and
   a lens calculator configured to produce, by performing an interpolation process on the first correction information by using image sensor information that is information on the image sensor and received from the image capturing apparatus, second correction information corresponding to the image sensor information,
   wherein the lens calculator is configured to:
      acquire a determination result of whether the lens calculator or the image capturing apparatus performs the interpolation process;
      perform the interpolation process and send the second correction information to the image capturing apparatus in a case where the acquired determination result is that the lens calculator performs the interpolation process; and
      send the first correction information to the image capturing apparatus in a case where the acquired determination result is that the image capturing apparatus performs the interpolation process.

2. A lens apparatus according to claim 1, wherein the lens calculator is configured to perform a determination process for determining whether the lens calculator or the image capturing apparatus performs the interpolation process to acquire the determination result.

3. A lens apparatus according to claim 2, wherein the lens calculator is configured to:
   compare a period of time required by the lens calculator to perform the interpolation process with a period of time required by the image capturing apparatus to perform the interpolation process; and
   perform the determination process depending on a result of the comparison.

4. A lens apparatus according to claim 2, wherein:
   the lens apparatus holds interpolation process capability information showing whether or not the lens calculator is capable of performing the interpolation process, and
   the lens calculator is configured to perform the determination process by using the interpolation process capability information.

5. A lens apparatus according to claim 2, wherein the lens calculator is configured to send the determination result to the image capturing apparatus.

6. A lens apparatus according to claim 1, wherein:
the first correction information contains multiple arrays corresponding to the image sensor information on mutually different image sensors, and
the lens calculator is configured to:
select, from the multiple arrays, two or more arrays each corresponding to different image sensor information from the image sensor information received from the image capturing apparatus; and
perform the interpolation process by using the first correction information of the selected arrays.

7. A lens apparatus according to claim 6, wherein each of the multiple arrays corresponds to the image sensor information containing first image sensor information on a pixel size of the image sensor and second image sensor information on a set pupil distance that is a set distance from the image sensor to an exit pupil of the image capturing optical system.

8. A lens apparatus according to claim 6, wherein the lens calculator is configured to send, to the image capturing apparatus, information on the array contained in the first correction information.

9. A lens apparatus according to claim 6, wherein the lens calculator is configured to:
receive, from the image capturing apparatus, array indication information indicating the array; and
send, to the image capturing apparatus, the first correction information of the array indicated by the array indication information.

10. A lens apparatus according to claim 1, wherein the image capturing apparatus is configured to determine whether the lens apparatus or the image capturing apparatus performs the interpolation process, and
wherein the lens apparatus is configured to receive a result of the determination from the image capturing apparatus to acquire the determination result.

11. An image capturing apparatus configured to allow a detachable attachment of a lens apparatus including an image capturing optical system configured to form an object image and configured to communicate with the lens apparatus, the image capturing apparatus comprising:
an image sensor configured to photoelectrically convert the object image;
a detector configured to detect focus state information that is information on a focus state of the image capturing optical system by using a signal from the image sensor; and
a camera calculator configured to receive, from the lens apparatus, first correction information for correcting the focus state information and configured to produce second correction information by performing an interpolation process on the first correction information by using image sensor information that is information on the image sensor,
wherein the camera calculator is configured to:
receive the second correction information from the lens apparatus in a case where the lens apparatus acquires a determination result that the lens apparatus performs the interpolation process; and
receive the first correction information from the lens apparatus in a case where the lens apparatus acquires a determination result that the camera calculator performs the interpolation process.

12. An image capturing apparatus according to claim 11, wherein:
the image capturing apparatus holds the image sensor information containing first image sensor information on a pixel size of the image sensor and second image sensor information on a set pupil distance that is a set distance from the image sensor to an exit pupil of the image capturing optical system, and
the camera calculator is configured to send the first image sensor information and second image sensor information to the lens apparatus.

13. An image capturing apparatus according to claim 11, wherein:
the first correction information stored in the lens apparatus contains multiple arrays corresponding to the image sensor information on mutually different image sensors, and
the camera calculator is configured to:
produce, from information on the array received from the lens apparatus and from the first image sensor information and the second image sensor information, array indication information indicating the array and being to be received from the lens apparatus; and
send the array indication information to the lens apparatus.

14. An image capturing apparatus according to claim 13, wherein the camera calculator is configured to:
receive, from the lens apparatus, the determination result as a result of a determination process performed by the lens apparatus for determining whether the lens apparatus or the image capturing apparatus performs the interpolation process;
send the array indication information to the lens apparatus and to receive, from the lens apparatus, the first correction information of the array indicated by the array indication information in a case where the received determination result shows that the image capturing apparatus performs the interpolation process; and
send the first image sensor information and the second image sensor information to the lens apparatus and to receive the second correction information from the lens apparatus in a case where the received determination result shows that the lens apparatus is to perform the interpolation process.

15. A non-transitory computer-readable recording medium storing a program configured to cause a computer in a lens apparatus to perform a process,
the lens apparatus being configured to be detachably attached to an image capturing apparatus including an image sensor, being configured to communicate with the image capturing apparatus, and including an image capturing optical system configured to form an object image to be photoelectrically converted by the image sensor and storing first correction information for correcting focus state information that is information on a focus state of the image capturing optical system detected in the image capturing apparatus by using a signal from the image sensor,
the process comprising producing, by performing an interpolation process on the first correction information by using image sensor information that is information on the image sensor and received from the image capturing apparatus, second correction information corresponding to the image sensor information,
wherein the process further comprises:
acquiring a determination result of whether the computer or the image capturing apparatus performs the interpolation process;
performing the interpolation process and sending the second correction information to the image capturing apparatus in a case where the acquired determination result is that the computer performs the interpolation process; and sending the first correction information to the image capturing apparatus in a case where the acquired determination result is that the image capturing apparatus performs the interpolation process.

16. A non-transitory computer-readable recording medium storing a program configured to cause a computer in an image capturing apparatus to perform a process, the image capturing apparatus being configured to allow a detachable attachment of a lens apparatus including an image capturing optical system configured to form an object image, being configured to communicate with the lens apparatus, and including an image sensor configured to photoelectrically convert the object image and being configured to detect focus state information that is information on a focus state of the image capturing optical system by using a signal from the image sensor, the process comprising:

receiving, from the lens apparatus, first correction information for correcting the focus state information; and producing second correction information by performing an interpolation process on the first correction information by using image sensor information that is information on the image sensor, wherein the process further comprises:

receiving the second correction information from the lens apparatus in a case where the lens apparatus acquires a determination result that the lens apparatus performs the interpolation process; and receiving the first correction information from the lens apparatus in a case where the lens apparatus acquires a determination result that the computer performs the interpolation process.

* * * * *